United States Patent
Peng et al.

(10) Patent No.: US 10,423,560 B2
(45) Date of Patent: Sep. 24, 2019

(54) HOT PLUG METHOD, HOST CONTROLLER, HOST, AND PCIE BRIDGE DEVICE

(71) Applicant: HUAWEI TECHNOLOGIES CO., LTD., Shenzhen (CN)

(72) Inventors: Benhua Peng, Hangzhou (CN); Fu Wang, Munich (DE); Pei Wu, Hangzhou (CN); Huaifeng Xiao, Shenzhen (CN); Xiaoping Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/859,758

(22) Filed: Jan. 2, 2018

(65) Prior Publication Data
US 2018/0121383 A1 May 3, 2018

Related U.S. Application Data
(63) Continuation of application No. PCT/CN2016/098743, filed on Sep. 12, 2016.

(30) Foreign Application Priority Data
Jan. 15, 2016 (CN) .......................... 2016 1 0029365

(51) Int. Cl.
*G06F 13/40* (2006.01)
*G06F 11/20* (2006.01)
(Continued)

(52) U.S. Cl.
CPC .......... *G06F 13/4081* (2013.01); *G06F 13/24* (2013.01); *G06F 13/4027* (2013.01);
(Continued)

(58) Field of Classification Search
None
See application file for complete search history.

(56) References Cited

U.S. PATENT DOCUMENTS
8,838,865 B2  9/2014 Daniel
8,843,688 B2  9/2014 Engebretsen et al.
(Continued)

FOREIGN PATENT DOCUMENTS
CN   1740997 A   3/2006
CN   102117259 A  7/2011
(Continued)

OTHER PUBLICATIONS
Huang Liang, "PCIe external connections: switch, transmission distance and storage applications", ChinaByte, Apr. 11, 2012, 12 pages.
(Continued)

*Primary Examiner* — Hyun Nam
(74) *Attorney, Agent, or Firm* — Kilpatrick Townsend & Stockton LLP

(57) ABSTRACT

A hot plug method, a host controller, a host, and a PCIe bridge device. The method includes: generating, by a host controller, a first notification packet, where the first notification packet includes hot plug interruption information, and the hot plug interruption information indicates that a first PCIe device is to be hot-plugged; sending, by the host controller, the first notification packet to a host, so that the host performs, according to the first notification packet, a hot plug operation corresponding to the PCIe device; and receiving, by the host controller, a second notification packet sent by the host, and sending the second notification packet to a user equipment controller, to facilitate the user equipment controller to instruct a user to insert or remove the PCIe device, where the second notification packet is for indicating
(Continued)

that the hot plug operation corresponding to the PCIe device is completed.

16 Claims, 12 Drawing Sheets

(51) Int. Cl.
  *G06F 13/24* (2006.01)
  *G06F 13/42* (2006.01)
(52) U.S. Cl.
  CPC .. *G06F 13/4282* (2013.01); *G06F 2213/0026* (2013.01); *G06F 2213/2424* (2013.01); *G06F 2213/4002* (2013.01)

(56) References Cited

U.S. PATENT DOCUMENTS

| | | | |
|---|---|---|---|
| 2003/0131227 A1 | 7/2003 | Gardiner et al. | |
| 2007/0136504 A1* | 6/2007 | Wu | G06F 13/4081 710/302 |
| 2008/0040526 A1 | 2/2008 | Suzuki et al. | |
| 2009/0006710 A1* | 1/2009 | Daniel | G06F 9/45558 710/315 |
| 2010/0106881 A1 | 4/2010 | Daniel | |
| 2011/0072182 A1 | 3/2011 | Suzuki | |
| 2012/0072633 A1 | 3/2012 | Elboim | |

FOREIGN PATENT DOCUMENTS

| | | |
|---|---|---|
| CN | 102662903 A | 9/2012 |
| CN | 105205021 A | 12/2015 |
| CN | 105701051 A | 6/2016 |
| WO | 2014206356 A2 | 12/2014 |

OTHER PUBLICATIONS

PCI Express® Base Specification Revision 4.0 Version 0.3, PCI Express, Feb. 19, 2014, 1053 pages.

* cited by examiner

HOT PLUG METHOD, HOST CONTROLLER, HOST, AND PCIE BRIDGE DEVICE

CROSS-REFERENCE TO RELATED APPLICATIONS

This application is a continuation of International Application No. PCT/CN2016/098743, filed on Sep. 12, 2016, which claims priority to Chinese Patent Application No. 201610029365.6, filed on Jan. 15, 2016. The disclosures of the aforementioned applications are hereby incorporated by reference in their entireties.

TECHNICAL FIELD

The present disclosure relates to the field of computer technologies, and in particular, to a hot plug method, a host controller, a host, and a PCIe bridge device.

BACKGROUND

Hot plug is a technology that allows a user to remove or replace, when a system is not shut down or powered off, a Peripheral Component Interconnect Express (PCIe) device mounted in downstream of a host, without affecting running of a host server system, so that a timely redundancy capability, expansibility, flexibility, and the like of the system are improved. At present, a hot plug function is critical to maintaining "high availability" of a PCIe system.

An existing hot plug technology is mainly as follows: After it is detected that a user triggers hot plug, an indicator is controlled to blink. Then, a PCIe bus is used to instruct a driver of a PCIe device to stop transmitting data, a link (connection) between the PCIe device and a slot is disrupted, and the slot is powered off. In this way, the physical connection between the PCIe device and the slot is in a high-impedance state, the indicator is off, the user removes the device, and hot removal is completed.

Because the data transmission based on the PCIe bus is distance-limited, the PCIe device can be used only in a limited short distance. The existing hot plug technology is hot plug in this scenario. As a requirement for using the PCIe device increases, currently, the PCIe device is remotely used. For example, a PCIe bridge device is used to cascade a PCIe device, PCIe data is carried in another transmission protocol for transmission, the PCIe device is moved far away, and a physical distance between the PCIe device and a host server exceeds a PCIe signal transmission distance threshold specified by the PCIe protocol.

Existing hot plug is specific only to a short-distance PCIe device. There is neither a device nor a function for performing hot plug on a remotely used PCIe device.

SUMMARY

The present disclosure provides a hot plug method, a host controller, a host, and a PCIe bridge device, so that hot plug can be performed in a scenario in which a PCIe device is remotely used.

To achieve the foregoing objective, the following technical solutions are used in embodiments of the present disclosure.

According to a first aspect, a hot plug method is disclosed and includes:

First, in a scenario in which a PCIe device is remotely used, a host controller may be additionally disposed on a host side. In addition, a user equipment controller is additionally disposed on a user equipment (the PCIe device) side. The host controller communicates with the user equipment controller by through a network.

During specific implementation, first, the host controller generates a first notification packet, where the first notification packet includes hot plug interruption information, and the hot plug interruption information indicates that a first PCIe device is to be hot-plugged. The host is connected to the host controller, the first PCIe device is connected to the user equipment controller, and the host controller communicates with the user equipment controller by using the network.

Then, the host controller sends the first notification packet to the host, so that the host performs, according to the first notification packet, a hot plug operation corresponding to the first PCIe device.

Finally, the host controller receives a second notification packet sent by the host, and sends the second notification packet to the user equipment controller, so that the user equipment controller instructs a user to insert or remove the first PCIe device, where the second notification packet is for indicating that the hot plug operation corresponding to the first PCIe device is completed.

The host and the PCIe device may communicate with each other by means of PCIe bridge cascading. In this case, a PCIe bridge device connected to the host needs to have information about the PCIe device and can instruct the host to perform a corresponding removal or insertion operation when the PCIe device is removed or inserted.

The host may be connected to the PCIe device by using a medium (such as a network) except a PCIe link. In this case, the host controller and the user equipment controller need to have functions of encapsulating a notification packet and parsing the notification packet.

When the PCIe device is remotely used, for example, the host and the PCIe device are in different physical positions, because the host controller on the host side may communicate with the user equipment controller on the PCIe device side by using the network, the host may perform hot plug control on the PCIe device by using the host controller, the user equipment controller, and the PCIe device, so that remote PCIe device hot plug is implemented.

With reference to the first aspect, in a first possible implementation of the first aspect, if the first PCIe device needs to be hot-inserted, the generating, by the host controller, a first notification packet specifically includes:

receiving, by the host controller, a third notification packet sent by the user equipment controller, where the third notification packet is generated by the user equipment controller after the user equipment controller detects that hot plug is triggered, and the third notification packet includes the hot plug interruption information. During specific implementation, after the user presses a hot plug button of the user equipment controller, the user equipment controller may generate the third notification packet. Alternatively, the user may initiate a hot plug request by using an out-of-band control module of the user equipment controller, and the user equipment controller generates the third notification packet according to the hot plug request.

Further, the host controller generates the first notification packet according to the third notification packet.

Alternatively, when detecting that hot plug is triggered, the host controller generates the first notification packet. The user may initiate a hot plug request by using an out-of-band control module of the host controller, and then the first notification packet is generated.

With reference to the first possible implementation of the first aspect, in a second possible implementation of the first aspect, if the first PCIe device needs to be hot-removed, the generating, by the host controller, a first notification packet further includes:

generating, by the host controller, the first notification packet when detecting that the network between the host controller and the user equipment controller is disconnected.

In such a case in which the network is suddenly disconnected, a corresponding hot plug operation needs to be performed on the PCIe device, so as to avoid a case in which because the network is suddenly disconnected, no response can be made to a request of the host and then the host is hung.

According to a second aspect, a hot plug method is disclosed and is applied to a remote PCIe system. The remote Peripheral Component Interconnect Express PCIe system includes a host, a host controller, a PCIe device, and a user equipment controller, and the method includes:

receiving, by the host, a first notification packet sent by the host controller, where the first notification packet includes hot plug interruption information, the hot plug interruption information indicates that a first PCIe device is to be hot-plugged, the host is connected to the host controller, the first PCIe device is connected to the user equipment controller, and the host controller communicates with the user equipment controller by through a network;

performing, by the host according to the first notification packet, a hot plug operation corresponding to the first PCIe device; and generating, by the host, a second notification packet, and sending the second notification packet to the host controller, where the second notification packet is for indicating that the hot plug operation corresponding to the first PCIe device is completed.

In the prior art, when the PCIe device is remotely used, for example, the host and the PCIe device are in different physical positions, because the host controller on a host side may communicate with the user equipment controller on a PCIe device side by using the network, the host may perform hot plug control on the PCIe device by using the host controller, the user equipment controller, and the PCIe device, so that remote PCIe device hot plug is implemented.

With reference to the second aspect, in a first possible implementation of the second aspect, the performing, by the host according to the first notification packet, a hot plug operation corresponding to the first PCIe device specifically includes:

obtaining, by the host, identification information of the first PCIe device and slot information corresponding to the first PCIe device;

determining, by the host, a first slot corresponding to the slot information; and disrupting, by the host, a connection between the first slot and the first PCIe device, and powering off the first slot.

This is a process of hot-removing the first PCIe device.

With reference to the second aspect, in a second possible implementation of the second aspect, the performing, by the host according to the first notification packet, a hot plug operation corresponding to the first PCIe device specifically includes:

obtaining, by the host, slot information of a first slot, where the first slot is a slot corresponding to the first PCIe device; and establishing, by the host, a connection between the first slot and the first PCIe device, and powering on the first slot.

This is a process of hot-inserting the first PCIe device.

According to a third aspect, a hot plug method is disclosed and includes:

detecting, by a host, whether a first link is abnormal, where the first link is a link between the host and a PCIe bridge device, and at least one PCIe device is mounted in downstream of the PCIe bridge device; and if the host detects the first link is abnormal, performing, by the host, a hot plug operation corresponding to the at least one PCIe device.

That the PCIe device is cascaded to the host by using a PCIe bridge device belongs to a scenario in which the PCIe device is remotely used. In an existing hot plug technology, PCIe device hot plug in this scenario cannot be implemented. In the present disclosure, a status of a link between the PCIe bridge device and the PCIe device is detected. When the link is abnormal, a corresponding hot plug operation is performed on each PCIe device mounted in downstream of the PCIe bridge device, so as to avoid a case in which because the link between the host and the PCIe bridge device is abnormal, no response can be made to a request of the host for performing reading or writing on the PCIe device and then the host is hung.

With reference to the third aspect, in a first possible implementation of the third aspect, the performing a hot plug operation corresponding to the at least one PCIe device specifically includes:

obtaining, by the host, identification information of each of the at least one PCIe device and slot information corresponding to each PCIe device; and disrupting, by the host, a connection between each PCIe device and a slot corresponding to each PCIe device, and powering off the slot corresponding to each PCIe device. In addition, the host uninstalls a PCIe device driver to release resources.

Certainly, only a corresponding hot-removal operation needs to be performed on the PCIe device in this scenario.

According to a fourth aspect, a hot plug method is disclosed and includes:

detecting, by a first PCIe bridge device, whether a second link is abnormal, where the second link is a link between the first PCIe bridge device and a second PCIe bridge device, the first PCIe bridge device is connected to a host, N PCIe devices are mounted in downstream of the second PCIe bridge device, and N is an integer greater than or equal to 1; and after finding, by means of detecting, that the second link is abnormal, generating, by the first PCIe bridge device, N fourth notification packets, where the N fourth notification packets are used to instruct the host to perform a hot plug operation corresponding to the N PCIe devices.

The first PCIe bridge device generates the N fourth notification packets for the N PCIe devices to instruct the host to hot-plug the N PCIe devices one by one, so as to avoid a case in which because the link between the first PCIe bridge device and the second PCIe bridge device is suddenly abnormal, no response can be made to a request of the host for performing reading or writing on the N PCIe devices and then the host is hung.

With reference to the fourth aspect, in a first possible implementation of the fourth aspect, the generating N fourth notification packets specifically includes:

determining, by the first PCIe bridge device according to a prestored PCIe topology structure, N pieces of identification information of the N PCIe devices and N pieces of slot information corresponding to the N PCIe devices;

generating N pieces of hot plug interruption information according to the N pieces of identification information and the N pieces of slot information; and generating one fourth notification packet according to each of the N pieces of hot plug interruption information, to obtain the N fourth notification packets.

According to a fifth aspect, a host controller is disclosed and is applied to a remote Peripheral Component Interconnect Express PCIe system, the remote PCIe system includes a host, the host controller, a PCIe device, and a user equipment controller, and the host controller includes:

a generation unit, configured to generate a first notification packet, where the first notification packet includes hot plug interruption information, the hot plug interruption information indicates that a first PCIe device is to be hot-plugged, the host is connected to the host controller, the first PCIe device is connected to the user equipment controller, and the host controller communicates with the user equipment controller by through a network;

a sending unit, configured to send the first notification packet to the host, so that the host performs, according to the first notification packet, a hot plug operation corresponding to the first PCIe device; and a receiving unit, configured to receive a second notification packet sent by the host, where the sending unit is further configured to send the second notification packet to the user equipment controller, so that the user equipment controller instructs a user to insert or remove the first PCIe device, where the second notification packet is for indicating that the hot plug operation corresponding to the first PCIe device is completed.

With reference to the fifth aspect, in a first possible implementation of the fifth aspect, the generation unit is specifically configured to: if the first PCIe device needs to be hot-inserted, receive a third notification packet sent by the user equipment controller, and generate the first notification packet according to the third notification packet, where the third notification packet is generated by the user equipment controller after the user equipment controller detects that hot plug is triggered, and the third notification packet includes the hot plug interruption information; or when detecting that hot plug is triggered, generate the first notification packet.

With reference to the first possible implementation of the fifth aspect, in a second possible implementation of the fifth aspect, the generation unit is further configured to: if the first PCIe device needs to be hot-removed, generate the first notification packet when detecting that the network between the host controller and the user equipment controller is disconnected.

According to a sixth aspect, a host is disclosed and is applied to a remote PCIe system, the remote Peripheral Component Interconnect Express PCIe system includes the host, a host controller, a PCIe device, and a user equipment controller, and the host includes:

a receiving unit, configured to receive a first notification packet sent by the host controller, where the first notification packet includes hot plug interruption information, the hot plug interruption information indicates that a first PCIe device is to be hot-plugged, the host is connected to the host controller, the first PCIe device is connected to the user equipment controller, and the host controller communicates with the user equipment controller by through a network;

a hot plug operation unit, configured to perform, according to the first notification packet, a hot plug operation corresponding to the first PCIe device;

a generation unit, configured to generate a second notification packet, where the second notification packet is for indicating that the hot plug operation corresponding to the first PCIe device is completed; and a sending unit, configured to send the second notification packet to the host controller.

With reference to the sixth aspect, in a first possible implementation of the sixth aspect, the hot plug operation unit is specifically configured to: obtain identification information of the first PCIe device and slot information corresponding to the first PCIe device; determine a first slot corresponding to the slot information; and disrupt a connection between the first slot and the first PCIe device, and power off the first slot.

With reference to the sixth aspect, in a second possible implementation of the sixth aspect, the hot plug operation unit is specifically configured to: obtain slot information of a first slot, where the first slot is a slot corresponding to the first PCIe device; and establish a connection between the first slot and the first PCIe device, and power on the first slot.

According to a seventh aspect, a host is disclosed and includes:

a detecting unit, configured to detect whether a first link is abnormal, where the first link is a link between the host and a PCIe bridge device, and at least one PCIe device is mounted in downstream of the PCIe bridge device; and a hot plug operation unit, configured to: if the detecting unit detects the first link is abnormal, perform a hot plug operation corresponding to the at least one PCIe device.

With reference to the seventh aspect, in a first possible implementation of the seventh aspect, the hot plug operation unit is specifically configured to: obtain identification information of each of the at least one PCIe device and slot information corresponding to each PCIe device; and disrupt a connection between each PCIe device and a slot corresponding to each PCIe device, and power off the slot corresponding to each PCIe device.

According to an eighth aspect, a first PCIe bridge device is disclosed and includes:

a detecting unit, configured to detect whether a second link is abnormal, where the second link is a link between the first PCIe bridge device and a second PCIe bridge device, the first PCIe bridge device is connected to a host, N PCIe devices are mounted in downstream of the second PCIe bridge device, and N is an integer greater than or equal to 1; and a generation unit, configured to: after the detecting unit detects the second link is abnormal, generate N fourth notification packets, where the N fourth notification packets are used to instruct the host to perform a hot plug operation corresponding to the N PCIe devices.

With reference to the eighth aspect, in a first possible implementation of the eighth aspect, the generation unit is specifically configured to: determine, according to a pre-stored PCIe topology structure, N pieces of identification information of the N PCIe devices and N pieces of slot information corresponding to the N PCIe devices;

generate N pieces of hot plug interruption information according to the N pieces of identification information and the N pieces of slot information; and generate one fourth notification packet according to each of the N pieces of hot plug interruption information, to obtain the N fourth notification packets.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Existing hot plug is standard hot plug defined in the PCIe protocol. The hot plug is specific only to a short-distance PCIe device, that is, can be applied only to a scenario in which a PCIe device is directly connected to a host. In a scenario in which a PCIe device is remotely applied, for example, the PCIe device and the host are in different places or the PCIe device and the host are connected to each other by using a PCIe bridge, the standard PCIe device hot plug manner is not flexible enough. In addition, in a complex PCIe topology structure, for example, in a PCIe bridge cascading scenario, the standard PCIe device hot plug method cannot meet a scenario requirement, and consequently, application of the PCIe device is limited.

A principle of the present disclosure is as follows: A host controller and a user equipment controller that can communicate with each other are additionally disposed between a host and a PCIe device, so that the host can hot-plug the PCIe device by using the host controller and the user equipment controller. Alternatively, a link between a PCIe bridge device and a PCIe device is detected. When it is found that the link is abnormal, a PCIe device mounted in downstream is hot-plugged.

Embodiment 1

Figure 1:
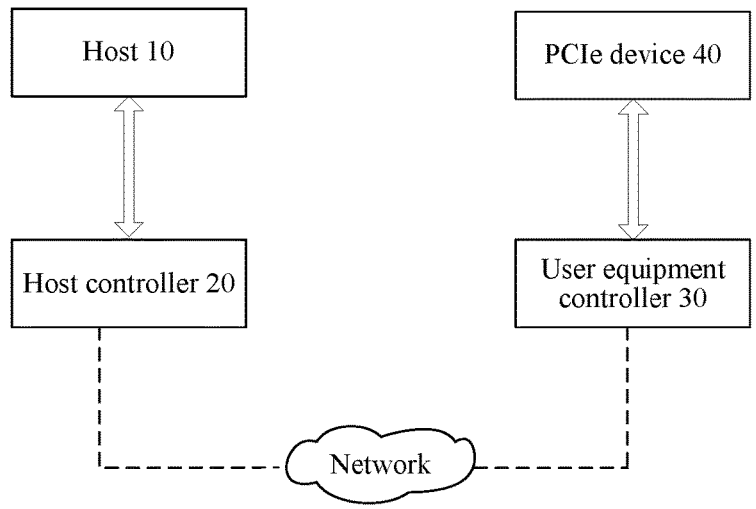
FIG. 1 is a schematic diagram of a remote PCIe system according to Embodiment 1 of the present disclosure.

This embodiment of the present invention provides a remote PCIe system. As shown in FIG. 1, the remote PCIe system includes a host 10, a host controller 20, a user equipment controller 30, and a PCIe device 40. The host 10 is connected to the host controller 20, the PCIe device 40 is connected to the user equipment controller 30, and the host controller 20 communicates with the user equipment controller 30 through a network. The network herein may be another transmission medium such as a fiber channel. What is applicable to the network is not only the TCP/IP but also another transmission protocol.

Figure 2:
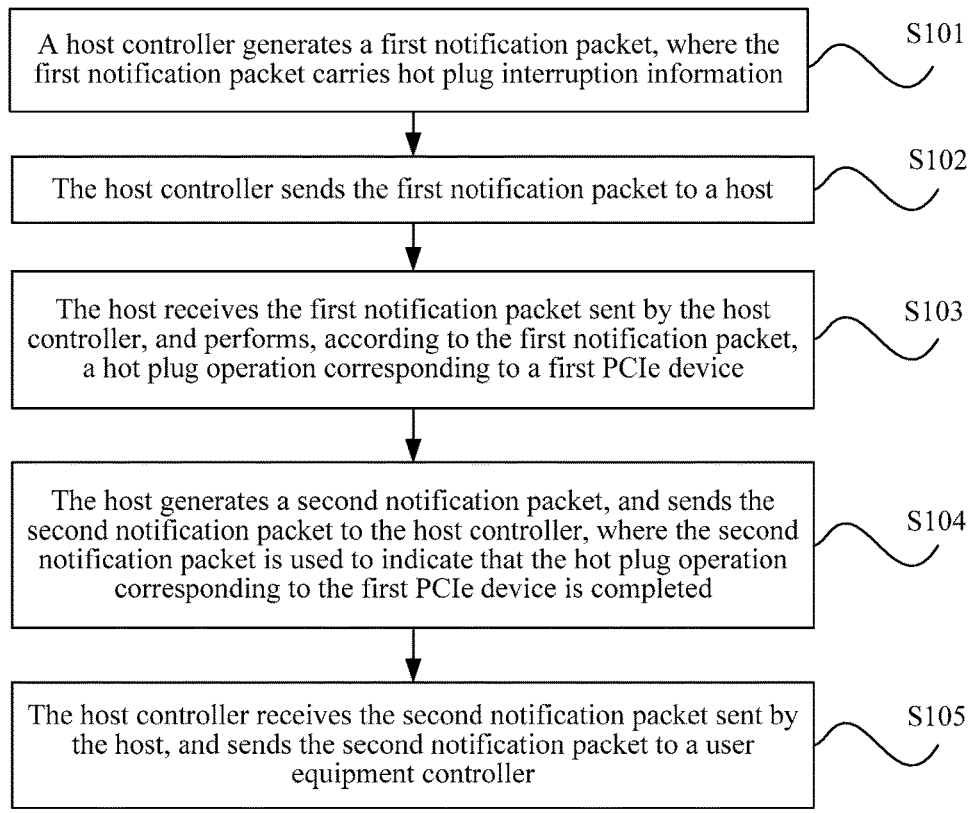
FIG. 2 is a schematic flowchart of a hot plug hot plug method according to Embodiment 1 of the present disclosure.

This embodiment of the present invention provides a hot plug method, and the method is applied to the remote PCIe system shown in FIG. 1. As shown in FIG. 2, the method includes the following steps.

S101. The host controller generates a first notification packet, where the first notification packet includes hot plug interruption information.

The hot plug interruption information includes identification information of a first PCIe device and slot information corresponding to the first PCIe device. The hot plug interruption information indicates that the first PCIe device is to be hot-plugged. The first PCIe device is the PCIe device 40 shown in FIG. 1.

In addition, the first notification packet may be a hot plug MSI interruption notification TLP packet.

During specific implementation, if the first PCIe device needs to be hot-inserted, the first notification packet may be generated in the following two manners.

Manner 1: The host controller receives a third notification packet sent by the user equipment controller; and the host controller generates the first notification packet according to the third notification packet.

The third notification packet is generated by the user equipment controller after the user equipment controller detects that hot plug is triggered, and the third notification packet includes the hot plug interruption information.

Specifically, a user may initiate a hot plug request by using the user equipment controller, and the user equipment controller may generate the third notification packet. The third notification packet may be an Ethernet notification packet such as an L2 packet, or a packet to which another network transmission protocol (other than the TCP/IP) is applicable.

Manner 2: When detecting that hot plug is triggered, the host controller generates the first notification packet.

During specific implementation, a user may initiate a hot plug request by using the host controller.

If the first PCIe device needs to be hot-removed, the host controller may obtain the first notification packet in a third manner other than the foregoing two manners.

Manner 3: The host controller generates the first notification packet when detecting that the network between the host controller and the user equipment controller is disconnected.

S102. The host controller sends the first notification packet to the host.

S103. The host receives the first notification packet sent by the host controller, and performs, according to the first notification packet, a hot plug operation corresponding to the first PCIe device.

During specific implementation, if the first PCIe device needs to be hot-removed, step 103—i.e., the performing, by the host according to the first notification packet, a hot plug operation corresponding to the first PCIe device specifically includes:

obtaining, by the host, the identification information of the first PCIe device and the slot information corresponding to the first PCIe device; determining a first slot corresponding to the slot information; and disrupting a connection between the first slot and the first PCIe device, and powering off the first slot.

In addition, if the first PCIe device needs to be hot-inserted, the performing, by the host according to the first notification packet, a hot plug operation corresponding to the first PCIe device specifically includes:

obtaining, by the host, slot information of a first slot, where the first slot is a slot corresponding to the first PCIe device; and establishing, by the host, a connection between the first slot and the first PCIe device, and powering on the first slot.

S104. The host generates a second notification packet, and sends the second notification packet to the host controller, where the second notification packet is for indicating that the hot plug operation corresponding to the first PCIe device is completed.

S105. The host controller receives the second notification packet sent by the host, and sends the second notification packet to the user equipment controller.

The second notification packet is for indicating that the hot plug operation corresponding to the first PCIe device is completed.

The second notification packet is sent, so that the user equipment controller instructs the user to insert or remove the first PCIe device. During specific implementation, the user equipment controller turns on an indicator, so as to indicate that the user may remove the first PCIe device or may insert the first PCIe device into a slot.

Further, function modules included in the host 10, the host controller 20, the user equipment controller 30, and the PCIe device 40 in FIG. 1 are described in detail. In addition, the hot plug method provided in the present disclosure is described in detail with reference to the function modules.

Figure 3A:
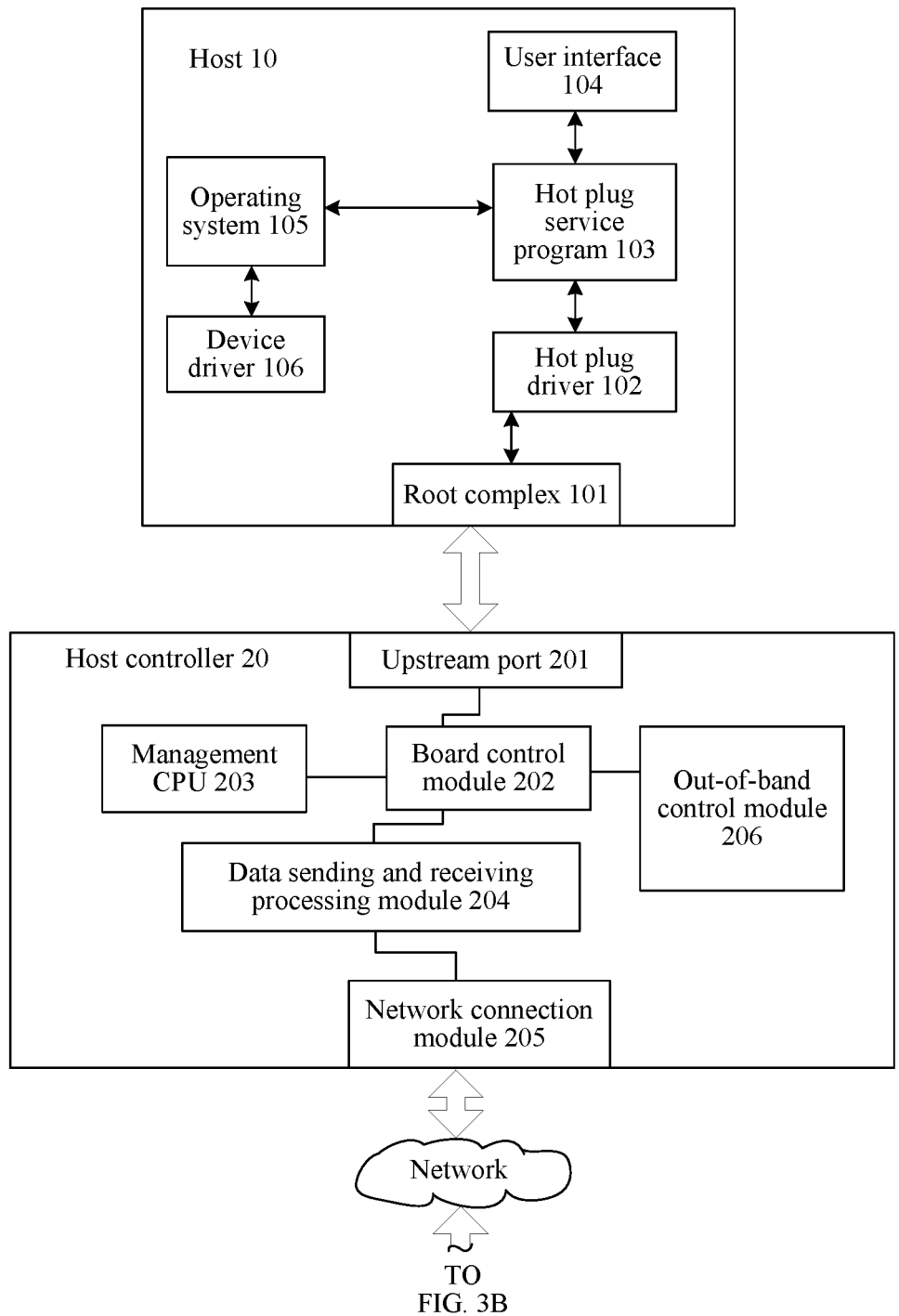
FIG. 3A and FIG. 3B are a structural block diagram of a host, a host controller, and a user equipment controller according to Embodiment 1 of the present disclosure.
Figure 3B:
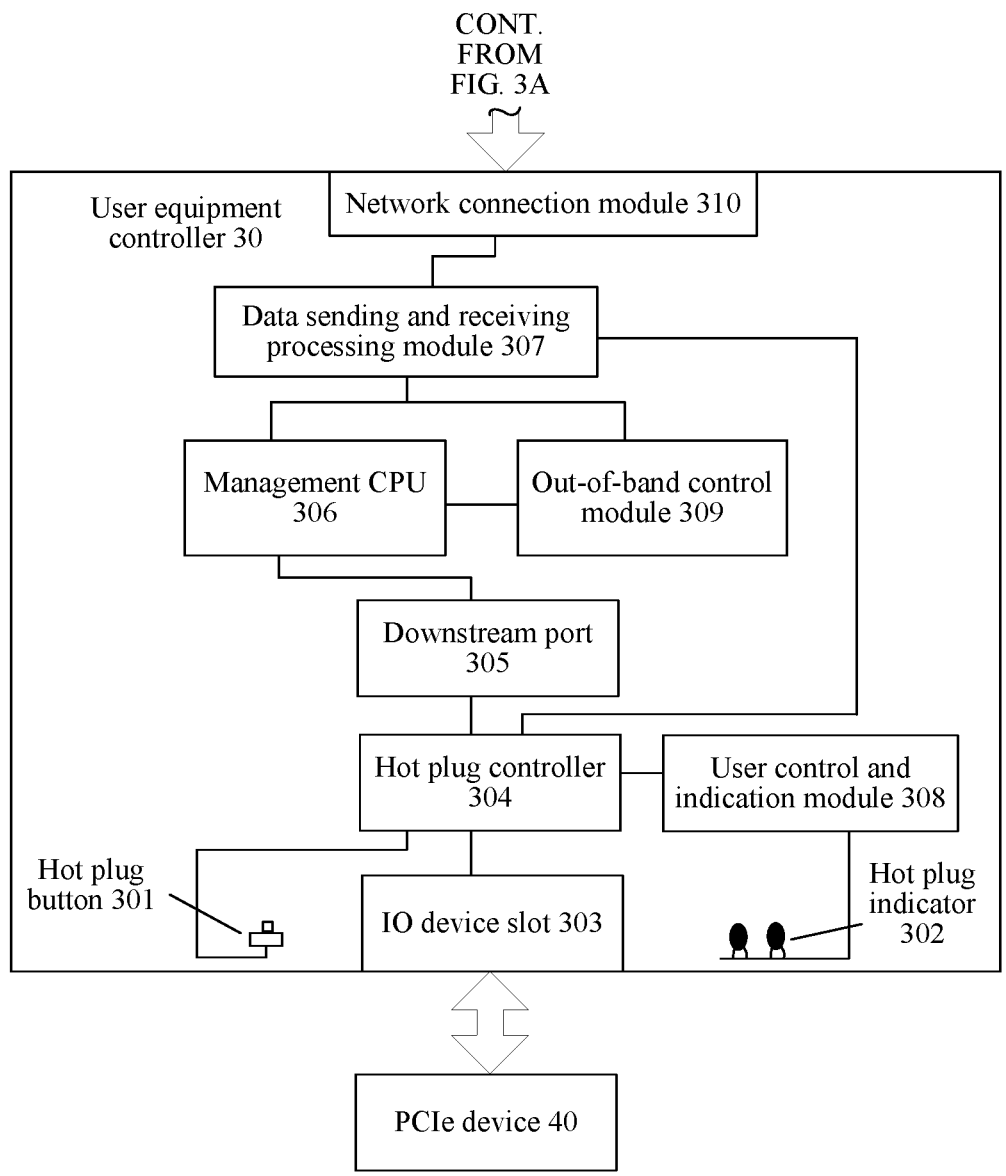

As shown in FIG. 3A and FIG. 3B, the host 10 includes a root complex 101, a hot plug driver 102, a hot plug service program 103, a user interface 104, an operating system (OS) 105, and a device driver 106.

The host controller 20 is a control board and includes an upstream port 201, a board control module 202, a management CPU 203, a data sending and receiving processing module 204, a network connection module 205, an out-of-band control module 206.

The user equipment controller 30 is a control board and includes a hot plug button 301, a hot plug indicator 302, an I/O device slot 303, a hot plug controller 304, downstream port 305, a user control and indication module 308, a management CPU 306, a data sending and receiving processing module 307, a network connection module 310, and an out-of-band control module 309.

With reference to FIG. 3A and FIG. 3B, the following describes in detail the hot plug method provided in this embodiment of the present invention.

Figure 4A:
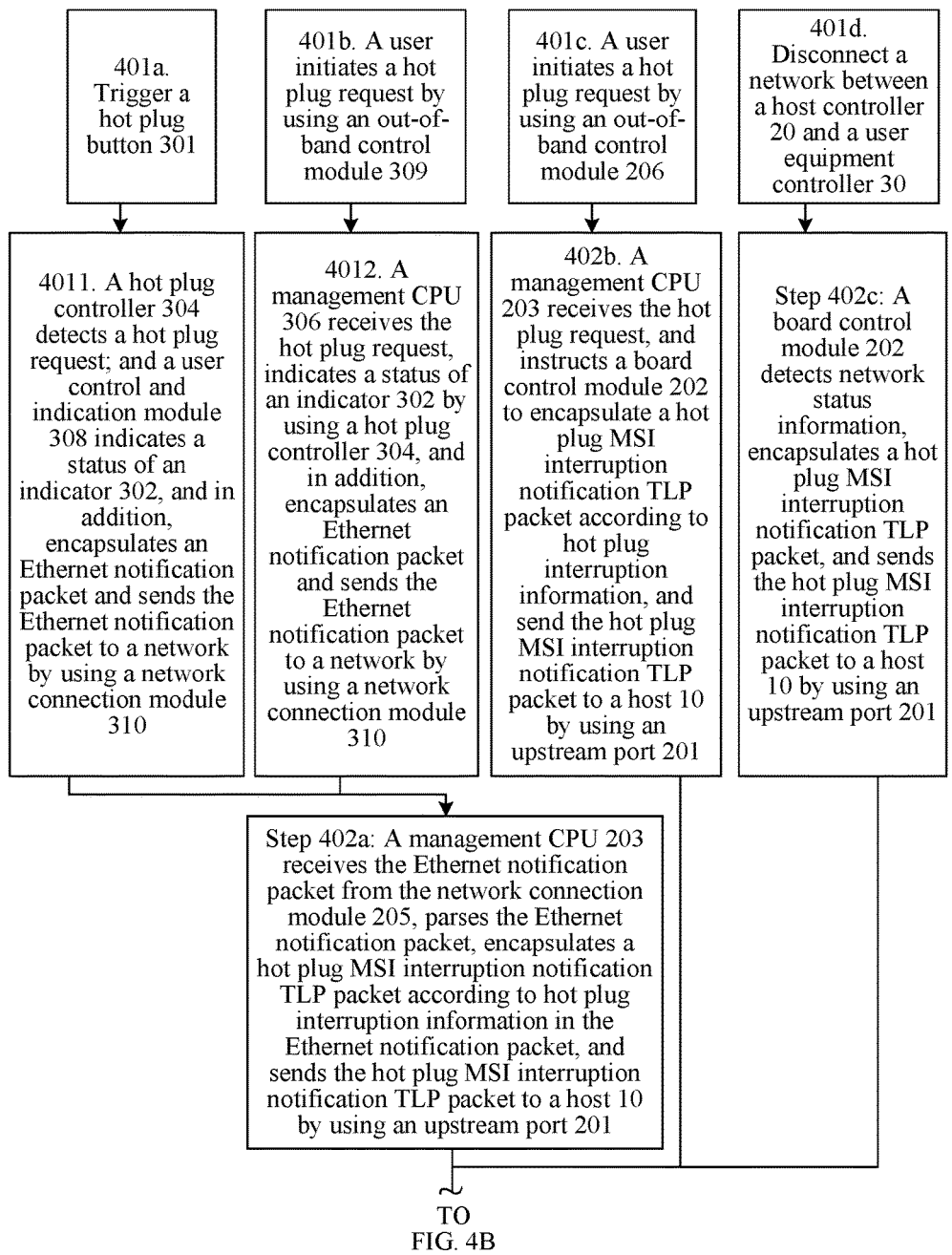
FIG. 4A and FIG. 4B are a schematic flowchart of a hot removal hot plug method according to Embodiment 1 of the present disclosure.
Figure 4B:
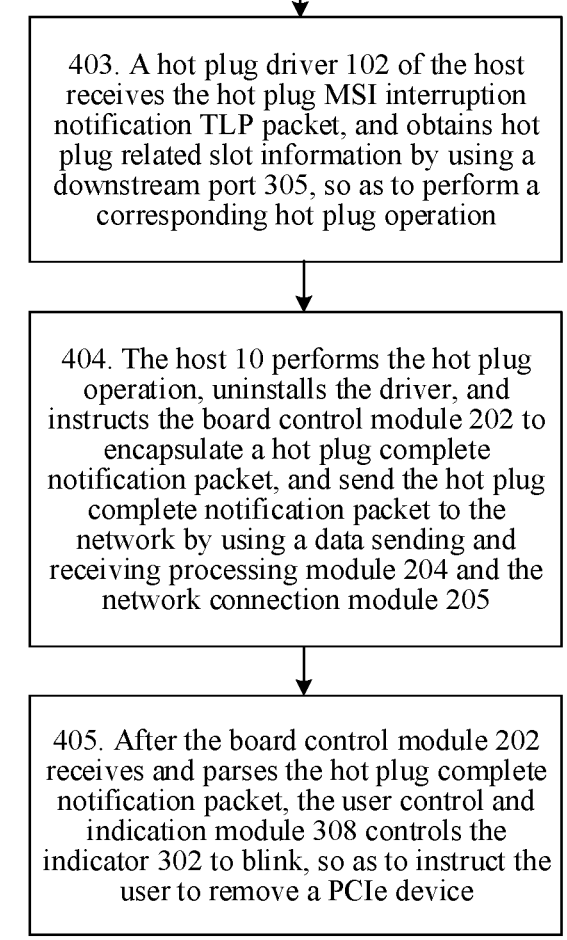

First, a method for hot-removing a PCIe device is provided. As shown in FIG. 4A and FIG. 4B, the method includes the following steps.

401a. Trigger the hot plug button 301 of the user equipment controller.

401b. A user initiates a hot plug request by using the out-of-band control module 309 of the user equipment controller 30.

401c. A user initiates a hot plug request by using the out-of-band control module 206 of the host controller 20.

401d. Disconnect a network between the host controller 20 and the user equipment controller 30.

During specific implementation, either step 401a or step 401b is performed. However, subsequent steps are different.

Step 4011 is performed after step 401a. Step 4011: The hot plug controller 304 of the user equipment controller 30 detects a hot plug request; and the user control and indication module 308 indicates a status of the indicator 302, and in addition, encapsulates an Ethernet notification packet and sends the Ethernet notification packet to a network by using the network connection module 310.

Step 4012 is performed after step 401b. Step 4012: The management CPU 306 receives the hot plug request, indicates a status of the indicator 302 by using the hot plug controller 304, and in addition, encapsulates an Ethernet notification packet and sends the Ethernet notification packet to a network by using the network connection module 310.

Step 402a is performed after both step 4011 and step 4012. Step 402a: The management CPU 203 receives the Ethernet notification packet from the network connection module 205, parses the Ethernet notification packet, encapsulates a hot plug MSI interruption notification TLP packet according to hot plug interruption information in the Ethernet notification packet, and sends the hot plug MSI interruption notification TLP packet to the host 10 by using the upstream port 201.

Step 402b is performed after step 401c. Step 402b: The management CPU 203 receives the hot plug request, and instructs the board control module 202 to encapsulate a hot plug MSI interruption notification TLP packet according to hot plug interruption information, and send the hot plug MSI interruption notification TLP packet to the host 10 by using the upstream port 201.

Step 402c is performed after step 401d. Step 402c: The board control module 202 detects network status information, encapsulates a hot plug MSI interruption notification TLP packet, and sends the hot plug MSI interruption notification TLP packet to the host 10 by using the upstream port 201.

Step 403 is performed after step 402a, step 402b, or step 402c.

403. The hot plug driver 102 of the host receives the hot plug MSI interruption notification TLP packet, and obtains hot plug related slot information by using the downstream port 305, so as to perform a corresponding hot plug operation.

404. The host 10 performs the hot plug operation, uninstalls the driver, and instructs the board control module 202 to encapsulate a hot plug complete notification packet, and send the hot plug complete notification packet to the network by using the data sending and receiving processing module 204 and the network connection module 205.

The hot plug complete notification packet is the second notification packet in the present disclosure.

405. After the board control module 202 receives and parses the hot plug complete notification packet, the user control and indication module 308 controls the indicator 302 to blink, so as to instruct the user to remove a PCIe device.

Figure 5A:
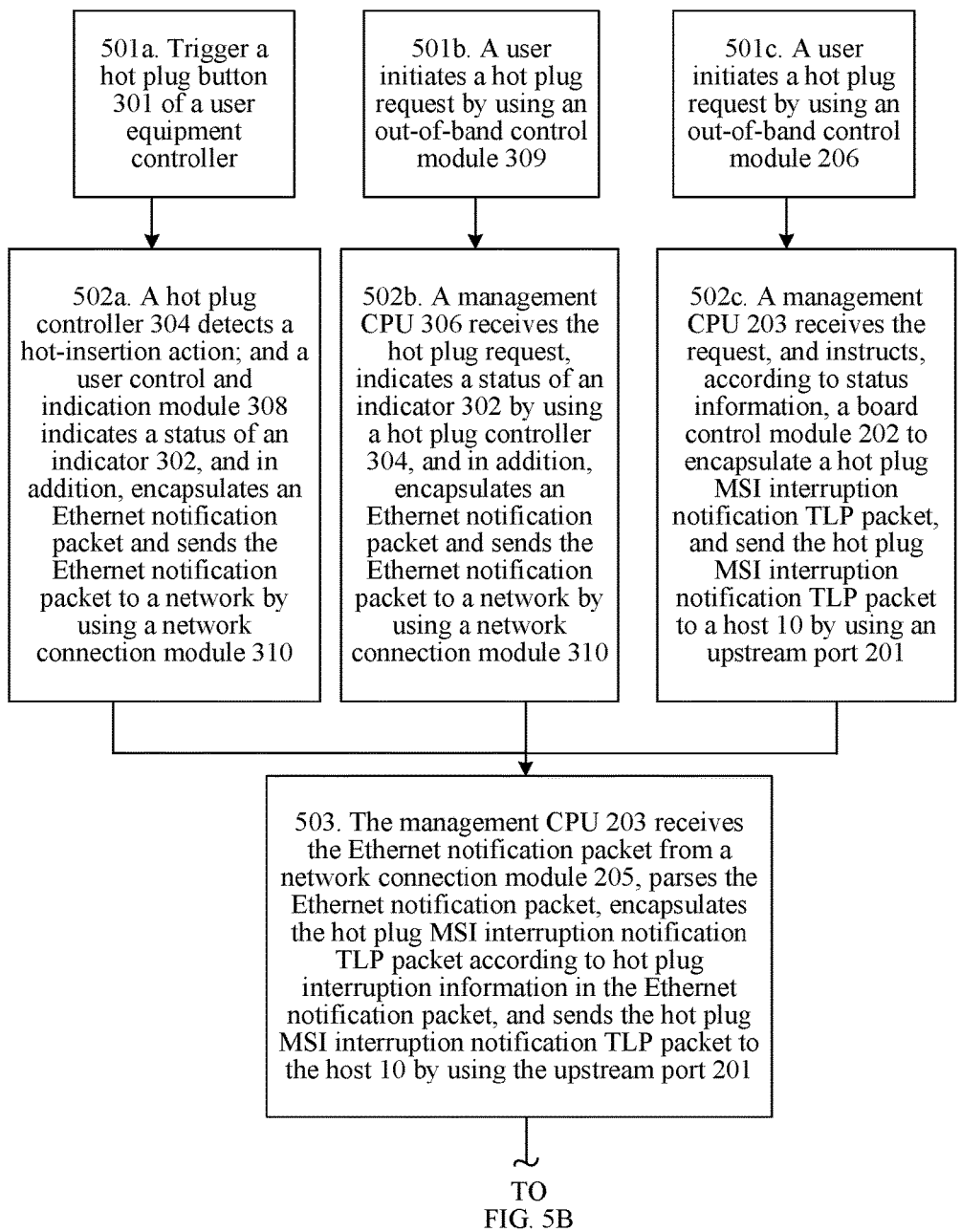
FIG. 5A and FIG. 5B are a schematic flowchart of a hot insertion hot plug method according to Embodiment 1 of the present disclosure.
Figure 5B:
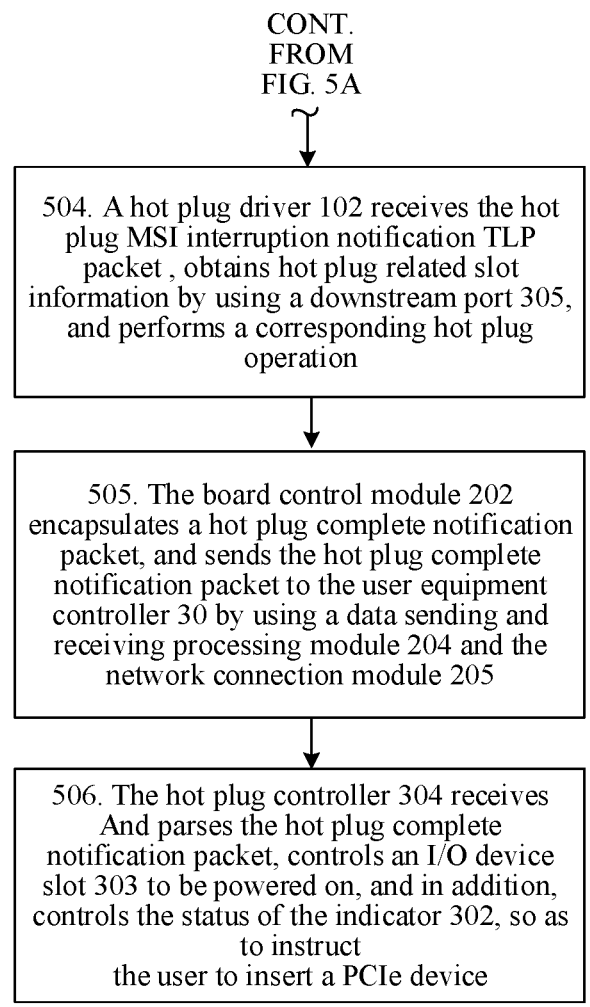

In addition, a method for hot-inserting a PCIe device is further provided. As shown in FIG. 5A and FIG. 5B, the method includes the following steps.

501a. Trigger the hot plug button 301 of the user equipment controller.

501b. A user initiates a hot plug request by using the out-of-band control module 309 of the user equipment controller 30.

501c. A user initiates a hot plug request by using the out-of-band control module 206 of the host controller 20.

Step 502a is performed after step 501a. Step 502a: The hot plug controller 304 detects a hot-insertion action; and the user control and indication module 308 indicates a status of the indicator 302, and in addition, encapsulates an Ethernet notification packet and sends the Ethernet notification packet to a network by using the network connection module 310.

Step 502b is performed after step 501b. Step 502b: The management CPU 306 receives the hot plug request, indicates a status of the indicator 302 by using the hot plug controller 304, and in addition, encapsulates an Ethernet notification packet and sends the Ethernet notification packet to a network by using the network connection module 310.

Step 502c is performed after step 501c. Step 502c: The management CPU 203 receives the request, and instructs, according to status information, the board control module 202 to encapsulate a hot plug MSI interrupt notification TLP packet, and send the hot plug MSI interrupt notification TLP packet to the host 10 by using the upstream port 201.

Step 503 is performed after step 502a, step 502b, or step 502c.

503. The management CPU 203 receives the Ethernet notification packet from the network connection module 205, parses the Ethernet notification packet, encapsulates the hot plug MSI interrupt notification TLP packet according to hot plug interrupt information in the Ethernet notification packet, and sends the hot plug MSI interrupt notification TLP packet to the host 10 by using the upstream port 201.

504. The hot plug driver 102 receives the hot plug MSI interrupt notification TLP packet, obtains hot plug related slot information by using the downstream port 305, and performs a corresponding hot plug operation.

505. The board control module 202 encapsulates a hot plug complete notification packet, and sends the hot plug complete notification packet to the user equipment controller 30 by using the data sending and receiving processing module 204 and the network connection module 205.

506. The hot plug controller 304 receives and parses the hot plug complete notification packet, controls the I/O device slot 303 to be powered on, and in addition, controls the status of the indicator 302, so as to instruct the user to insert a PCIe device.

According to the hot plug method provided in this embodiment of the present invention, the host controller is disposed on a host side, so as to connect to the host. The user equipment controller is disposed on a PCIe device side. The host controller communicates with the user equipment controller by using the network. After the hot plug is triggered, and the host performs packet exchange by using the host controller and the user equipment controller, the host performs the corresponding hot plug operation, and instructs the user to insert or remove the PCIe device. Therefore, PCIe device hot plug is implemented in a scenario in which the PCIe device is remotely used.

Embodiment 2

Figures 6, 7:
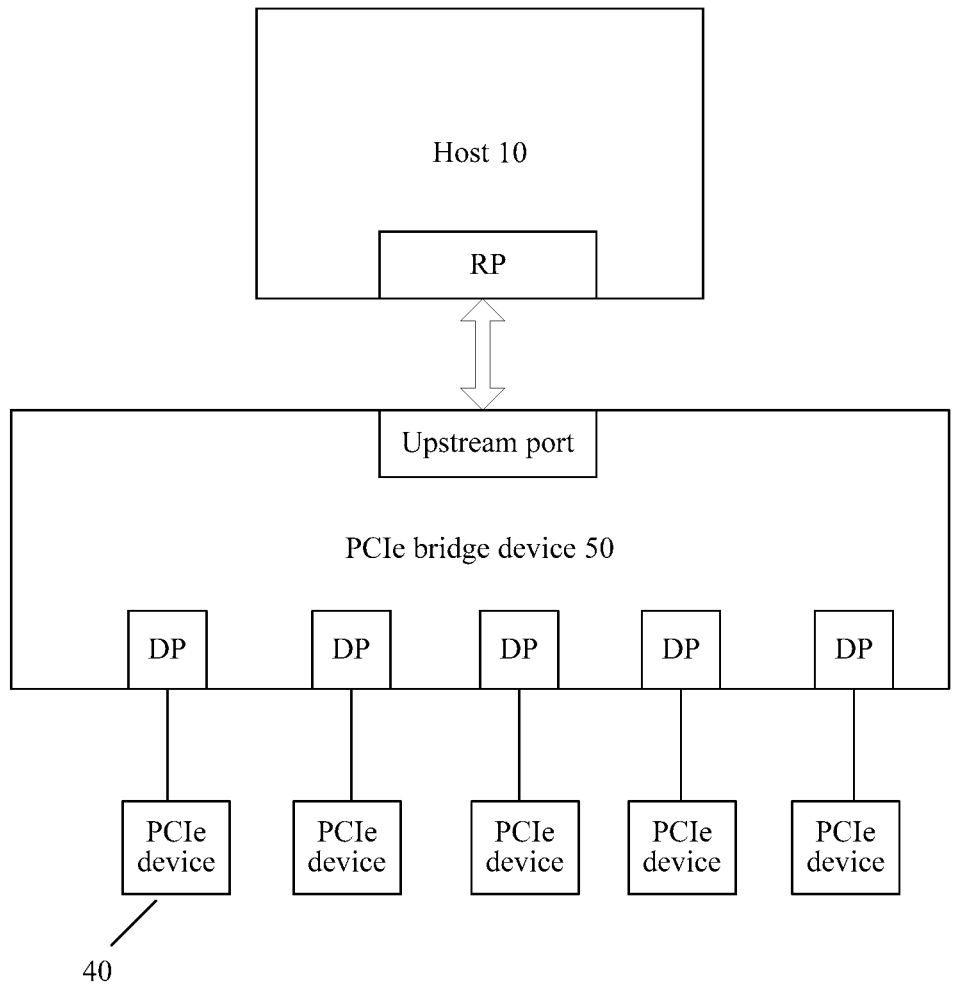
FIG. 6 is a schematic diagram of a remote PCIe system according to Embodiment 2 of the present disclosure.
FIG. 7 is a schematic flowchart of a hot plug hot plug method according to Embodiment 2 of the present disclosure.

This embodiment of the present invention provides a hot plug method, and the method is applied to a remote PCIe system shown in FIG. 6. As shown in FIG. 6, the remote PCIe system includes a host 10, a PCIe bridge device 50, and a PCIe device 40. The host 10 is connected to the PCIe bridge device 50. The PCIe bridge device 50 is connected to the PCIe device 40. The host 10 communicates with the PCIe device 40 by using the PCIe bridge device 50. An root port (RP) of the host 10 is connected to an upstream port of the PCIe bridge device 50. A downstream port (DP) of the PCIe bridge device 50 is connected to the PCIe device 40.

As shown in FIG. 7, the hot plug method provided in this embodiment includes the following steps.

601. The host detects whether a first link is abnormal, where the first link is a link between the host and the PCIe bridge device, and at least one PCIe device is mounted in downstream of the PCIe bridge device.

The first link may be a link between the host 10 and the PCIe bridge device 50 in FIG. 6.

One level of PCIe switch (the PCIe bridge device) is mounted in downstream of the host. Multiple PCIe devices are mounted in the downstream of the PCIe switch. If a PCIe link between the PCIe switch and the host is abnormal, to ensure that the host can correctly process the exception instead of being hung, a thread on a device driver on a host side may be started to detect a status of a link between an Root Complex (RC) and the upstream port, and a hot plug service is enabled once the driver detects that the link status is abnormal. In addition, the PCIe bridge device may have functions of the host controller 20 and the user equipment controller 30, so that the host can be prevented from breaking down. In addition, a hot plug procedure is shown in FIG. 4A and FIG. 4B and FIG. 5A and FIG. 5B.

602. If the host finds, by means of detecting, that the first link is abnormal, the host performs a hot plug operation corresponding to the at least one PCIe device.

It should be noted that only a corresponding hot-removal operation needs to be performed on the PCIe device in a scenario of FIG. 6.

Further, the performing a hot plug operation corresponding to the at least one PCIe device specifically includes:

obtaining, by the host, identification information of each of the at least one PCIe device and slot information corresponding to each PCIe device; and then disrupting, by the host, a connection between each PCIe device and a slot corresponding to each PCIe device, and powering off the slot corresponding to each PCIe device.

That the PCIe device is cascaded to the host by using a PCIe bridge device belongs to a scenario in which the PCIe device is remotely used. In an existing hot plug technology, PCIe device hot plug in this scenario cannot be implemented. In the present disclosure, a status of a link between the PCIe bridge device and the PCIe device is detected. When the link is abnormal, a corresponding hot plug operation is performed on each PCIe device mounted in downstream of the PCIe bridge device, so as to avoid a case in which because the link between the PCIe bridge device and the PCIe device is abnormal, no response can be made to a request of the host for performing reading or writing on the PCIe device and then the host is hung.

Embodiment 3

Figure 8:
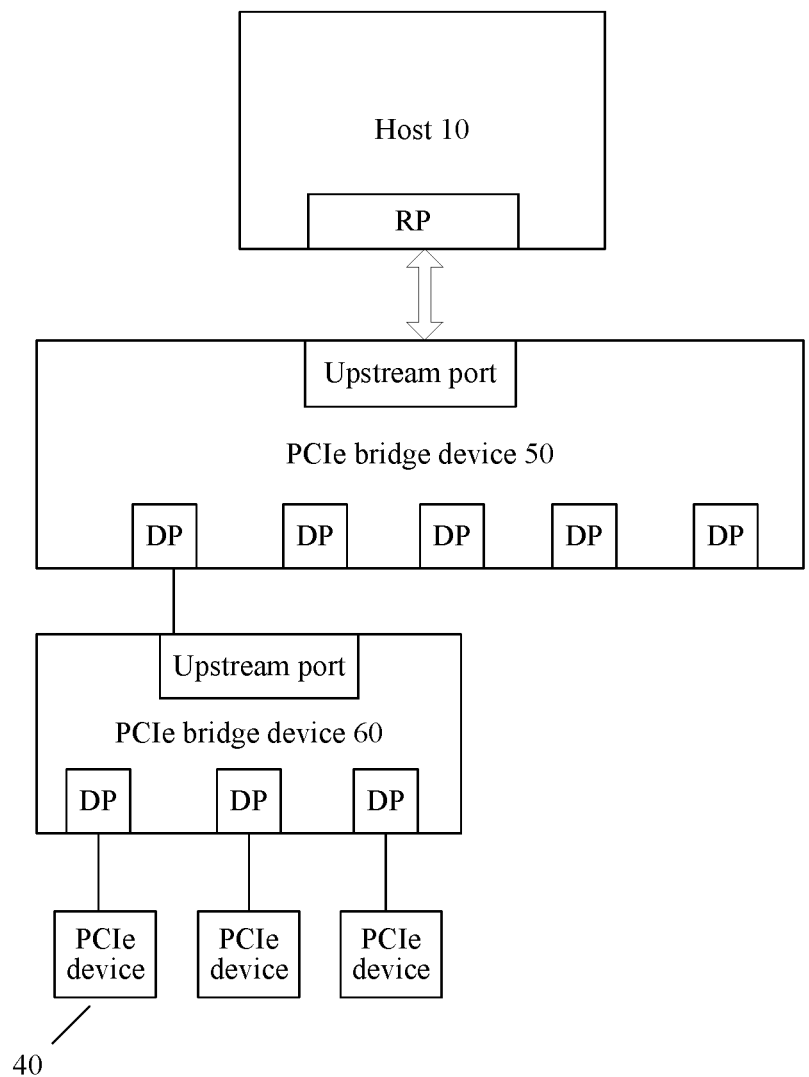
FIG. 8 is a schematic diagram of a remote PCIe system according to Embodiment 3 of the present disclosure.

This embodiment of the present invention provides a hot plug method, and the method is applied to a remote PCIe system shown in FIG. 8. As shown in FIG. 8, the remote PCIe system includes a host 10, a PCIe bridge device 50, a PCIe bridge device 60, and a PCIe device 40. The host 10 is connected to the PCIe bridge device 50. The PCIe bridge device 50 is connected to the PCIe bridge device 60. The host 10 communicates with the PCIe device 40 by using the PCIe bridge device 50 and the PCIe bridge device 60. An RP of the host 10 is connected to an upstream port of the PCIe bridge device 50. A DP of the PCIe bridge device 50 is connected to an upstream port of the PCIe bridge device 60.

Figure 9:
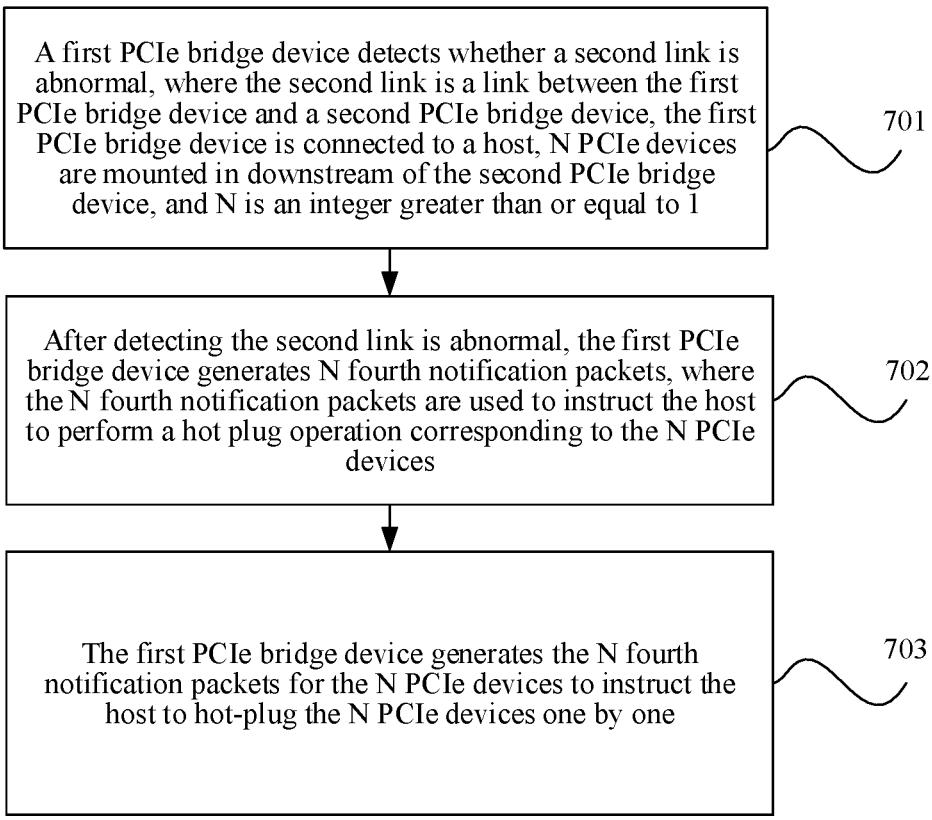
FIG. 9 is a schematic flowchart of a hot plug hot plug method according to Embodiment 3 of the present disclosure.

As shown in FIG. 9, the hot plug method provided in this embodiment includes the following steps.

701. A first PCIe bridge device detects whether a second link is abnormal, where the second link is a link between the first PCIe bridge device and a second PCIe bridge device, the first PCIe bridge device is connected to the host, N PCIe devices are mounted in downstream of the second PCIe bridge device, and N is an integer greater than or equal to 1.

702. After finding, by means of detecting, that the second link is abnormal, the first PCIe bridge device generates N fourth notification packets, where the N fourth notification packets are used to instruct the host to perform a hot plug operation corresponding to the N PCIe devices.

703. The first PCIe bridge device generates N notification packets for the N fourth PCIe devices to instruct the host to hot-plug the N PCIe devices one by one.

In this way, a case, in which because the link between the first PCIe bridge device and the second PCIe bridge device is suddenly abnormal, no response can be made to a request of the host for performing reading or writing on the N PCIe devices and then the host is hung, can be avoided.

Two levels of PCIe switches (the PCIe bridge device 50 and the PCIe bridge device 60) are mounted in downstream of the host. Multiple PCIe devices are mounted in downstream of a second level of PCIe switch (the PCIe bridge device 60). If a PCIe link between the two levels of PCIe switches (the link between the PCIe bridge device 50 and the PCIe bridge device 60) is abnormal, a PCIe topology structure may be recorded in a first level of PCIe switch (the PCIe bridge device 50), so that the host can correctly process the exception instead of being hung. When it is detected that the PCIe link between the two levels of PCIe switches is abnormal, interruption notification packets are encapsulated one by one according to the PCIe topology structure recorded in the first level of PCIe switch and then are sent to the host by using the upstream port. After receiving hot plug interruption packet, a hot plug driver of the host executes a hot plug service, and hot-plugs devices in downstream of the first level of bridge device one by one, so that the host is prevented from breaking down.

Further, the generating N fourth notification packets specifically includes:

determining, by the first PCIe bridge device according to a prestored PCIe topology structure, N pieces of identification information of the N PCIe devices and N pieces of slot information corresponding to the N PCIe devices; and generating N pieces of hot plug interruption information according to the N pieces of identification information and the N pieces of slot information; and generating one fourth notification packet according to each of the N pieces of hot plug interruption information, to obtain the N fourth notification packets.

That the PCIe device is cascaded to the host by using a PCIe bridge device belongs to a scenario in which the PCIe device is remotely used. In an existing hot plug technology, PCIe device hot plug in this scenario cannot be implemented. In the present disclosure, a status of a link between the PCIe bridge device and the PCIe device is detected. When the link is abnormal, a corresponding hot plug operation is performed on each PCIe device mounted in downstream of the PCIe bridge, so as to avoid a case in which because the link between the PCIe bridge device and the PCIe device is abnormal, no response can be made to a request of the host for performing reading or writing on the PCIe device and then the host is hung.

Embodiment 4

Figure 10:
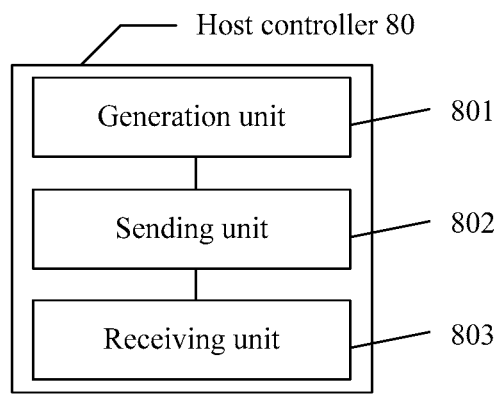
FIG. 10 is a structural block diagram of a host controller according to Embodiment 4 of the present disclosure.

This embodiment of the present invention provides a host controller 80, and the host controller 80 is applied to the remote PCIe system shown in FIG. 1. As shown in FIG. 10, the host controller 80 includes a generation unit 801, a sending unit 802, and a receiving unit 803.

The generation unit 801 is configured to generate a first notification packet, where the first notification packet includes hot plug interruption information, the hot plug interruption information indicates that a first PCIe device is to be hot-plugged, a host is connected to the host controller 80, the first PCIe device is connected to the user equipment controller, and the host controller 80 communicates with the user equipment controller by through a network.

The sending unit 802 is configured to send the first notification packet to the host, so that the host performs, according to the first notification packet, a hot plug operation corresponding to the first PCIe device.

The receiving unit 803 is configured to receive a second notification packet sent by the host.

The sending unit 802 is further configured to send the second notification packet to the user equipment controller, so that the user equipment controller instructs a user to insert or remove the first PCIe device, where the second notification packet is for indicating that the hot plug operation corresponding to the first PCIe device is completed.

The generation unit 801 is specifically configured to: if the first PCIe device needs to be hot-inserted, receive a third notification packet sent by the user equipment controller, and generate the first notification packet according to the third notification packet, where the third notification packet is generated by the user equipment controller after the user equipment controller detects that hot plug is triggered, and the third notification packet includes the hot plug interruption information.

Alternatively, when detecting that hot plug is triggered, the generation unit 801 generates the first notification packet.

The generation unit 801 is further configured to: if the first PCIe device needs to be hot-removed, generate the first notification packet when detecting that the network between the host controller and the user equipment controller is disconnected.

It should be noted that the sending unit 802 may be a transmitter of the host controller. The receiving unit 803 may be a receiver of the host controller. The generation unit 801 may be integrated into a processor of the host controller for implementation; or the generation unit 801 may be stored in a memory of the host controller in a form of program code, and a processor of the host controller invokes the code stored in the memory of the host controller, so as to perform the foregoing functions of the generation unit 801.

The host controller provided in this embodiment of the present invention is connected to the host. The user equipment controller is disposed on a PCIe device side. The host controller communicates with the user equipment controller by using the network. After the hot plug is triggered, and the host performs packet exchange by using the host controller and the user equipment controller, the host performs the corresponding hot plug operation, and instructs the user to insert or remove the PCIe device. Therefore, PCIe device hot plug is implemented in a scenario in which the PCIe device is remotely used.

Embodiment 5

Figure 11:
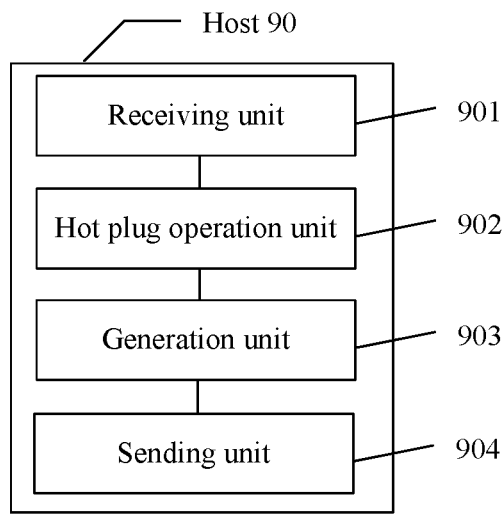
FIG. 11 is a structural block diagram of a host according to Embodiment 5 of the present disclosure.

This embodiment of the present invention provides a host 90, and the host 90 is applied to the remote PCIe system shown in FIG. 1. As shown in FIG. 11, the host 90 includes a receiving unit 901, a hot plug operation unit 902, a generation unit 903, and a sending unit 904.

The receiving unit 901 is configured to receive a first notification packet sent by a host controller, where the first notification packet includes hot plug interruption information, the hot plug interruption information indicates that a first PCIe device is to be hot-plugged, the host 90 is connected to the host controller, the first PCIe device is connected to a user equipment controller, and the host controller communicates with the user equipment controller by through a network.

The hot plug operation unit 902 is configured to perform, according to the first notification packet, a hot plug operation corresponding to the first PCIe device.

The generation unit 903 is configured to generate a second notification packet, where the second notification packet is for indicating that the hot plug operation corresponding to the first PCIe device is completed.

The sending unit 904 is configured to send the second notification packet to the host controller.

The hot plug operation unit 902 is specifically configured to: obtain identification information of the first PCIe device and slot information corresponding to the first PCIe device; determine a first slot corresponding to the slot information; and disrupt a connection between the first slot and the first PCIe device, and power off the first slot.

The hot plug operation unit 902 is specifically configured to: obtain slot information of a first slot, where the first slot is a slot corresponding to the first PCIe device; and establish a connection between the first slot and the first PCIe device, and power on the first slot.

It should be noted that the sending unit 904 may be a transmitter of the host. The receiving unit 901 may be a receiver of the host. The hot plug operation unit 902 and the generation unit 903 may be integrated into a processor of the host for implementation; or the hot plug operation unit 902 and the generation unit 903 may be stored in a memory of the host in a form of program code, and a processor of the host invokes the code stored in the memory of the host, so as to perform the foregoing functions of the hot plug operation unit 902 and the generation unit 903.

The host provided in this embodiment of the present invention is connected to the host controller. The user equipment controller is disposed on a PCIe device side. The host controller communicates with the user equipment controller by using the network. After the hot plug is triggered, and the host performs packet exchange by using the host controller and the user equipment controller, the host performs the corresponding hot plug operation, and instructs a user to insert or remove the PCIe device. Therefore, PCIe device hot plug is implemented in a scenario in which the PCIe device is remotely used.

Embodiment 6

Figure 12:
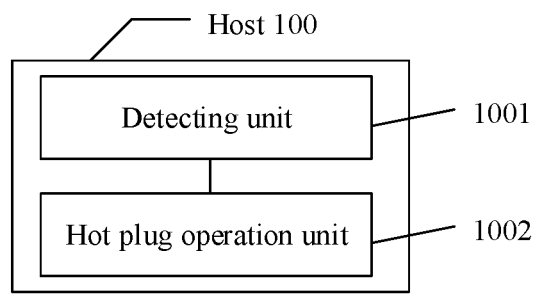
FIG. 12 is a structural block diagram of a host according to Embodiment 6 of the present disclosure.

This embodiment of the present invention provides a host 100, and the host 100 is applied to the remote PCIe system shown in FIG. 6. As shown in FIG. 12, the host 100 includes a detecting unit 1001 and a hot plug operation unit 1002.

The detecting unit 1001 is configured to detect whether a first link is abnormal, where the first link is a link between the host and a PCIe bridge device, and at least one PCIe device is mounted in downstream of the PCIe bridge device.

The hot plug operation unit 1002 is configured to: if the detecting unit detects the first link is abnormal, perform a hot plug operation corresponding to the at least one PCIe device.

The hot plug operation unit 1002 is specifically configured to: obtain identification information of each of the at least one PCIe device and slot information corresponding to each PCIe device; and disrupt a connection between each PCIe device and a slot corresponding to each PCIe device, and power off the slot corresponding to each PCIe device.

It should be noted that the detecting unit 1001 and the hot plug operation unit 1002 may be integrated into a processor of the host for implementation; or the detecting unit 1001 and the hot plug operation unit 1002 may be stored in a memory of the host in a form of program code, and a processor of the host invokes the code stored in the memory of the host, so as to perform the foregoing functions of the detecting unit 1001 and the hot plug operation unit 1002.

That the PCIe device is cascaded to the host by using a PCIe bridge device belongs to a scenario in which the PCIe device is remotely used. In an existing hot plug technology, PCIe device hot plug in this scenario cannot be implemented. In the present disclosure, a status of a link between the PCIe bridge device and the PCIe device is detected. When the link is abnormal, a corresponding hot plug operation is performed on each PCIe device mounted in downstream of the PCIe bridge, so as to avoid a case in which because the link between the PCIe bridge device and the PCIe device is abnormal, no response can be made to a request of the host for performing reading or writing on the PCIe device and then the host is hung.

Embodiment 7

Figure 13:
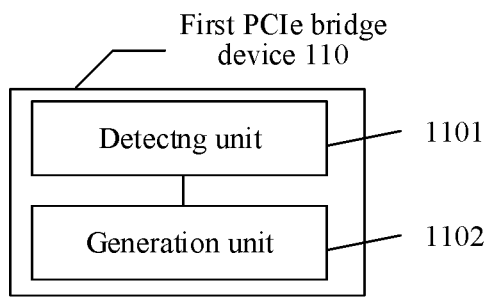
FIG. 13 is a structural block diagram of a first PCIe bridge device according to Embodiment 7 of the present disclosure.

This embodiment of the present invention provides a first PCIe bridge device 110, and the first PCIe bridge device 110 is applied to the remote PCIe system shown in FIG. 8. As shown in FIG. 13, the first PCIe bridge device 110 includes a detecting unit 1101 and a generation unit 1102.

The detecting unit 1101 is configured to detect whether a second link is abnormal, where the second link is a link between the first PCIe bridge device and a second PCIe bridge device, the first PCIe bridge device is connected to a host, N PCIe devices are mounted in downstream of the second PCIe bridge device, and N is an integer greater than or equal to 1.

The generation unit 1102 is configured to: after the detecting unit finds, by means of detecting, that the second link is abnormal, generate N fourth notification packets, where the N fourth notification packets are used to instruct the host to perform a hot plug operation corresponding to the N PCIe devices.

The generation unit 1102 is specifically configured to: determine, according to a prestored PCIe topology structure, N pieces of identification information of the N PCIe devices and N pieces of slot information corresponding to the N PCIe devices; generate N pieces of hot plug interruption information according to the N pieces of identification information and the N pieces of slot information; and generate one fourth notification packet according to each of the N pieces of hot plug interruption information, to obtain the N fourth notification packets.

It should be noted that the detecting unit 1101 and the generation unit 1102 may be integrated into a processor of the first PCIe bridge device for implementation; or the detecting unit 1101 and the generation unit 1102 may be stored in a memory of the first PCIe bridge device in a form of program code, and a processor of the first PCIe bridge device invokes the code stored in the memory of the first PCIe device, so as to perform the foregoing functions of the detecting unit 1101 and the generation unit 1102.

That the PCIe device is cascaded to the host by using a PCIe bridge device belongs to a scenario in which the PCIe device is remotely used. In an existing hot plug technology, PCIe device hot plug in this scenario cannot be implemented. In the present disclosure, a status of a link between the PCIe bridge device and the PCIe device is detected. When the link is abnormal, a corresponding hot plug operation is performed on each PCIe device mounted in downstream of the PCIe bridge, so as to avoid a case in which because the link between the PCIe bridge device and the PCIe device is abnormal, no response can be made to a request of the host for performing reading or writing on the PCIe device and then the host is hung.

Embodiment 8

Figure 14:
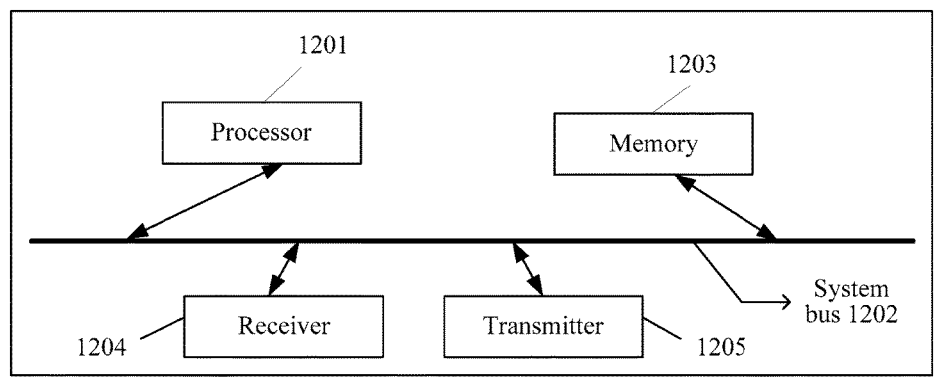
FIG. 14 is a structural block diagram of a hardware device according to Embodiment 8 of the present disclosure.

This embodiment of the present invention provides a hardware device 120. As shown in FIG. 14, the hardware device 120 includes a processor 1201, a system bus 1202, a memory 1203, a receiver 1204, and a transmitter 1205.

The processor 1201 may be a central processing unit (CPU).

The memory 1203 is configured to store program code, and transmit the program code to the processor 1201. The processor 1201 executes the following instruction according to the program code. The memory 1203 may include a volatile memory, for example, a random-access memory (RAM). The memory 1203 may further include a non-volatile memory, for example, a read-only memory (ROM), a flash memory, a hard disk drive (HDD), or a solid-state drive (SSD). The memory 1203 may further include a combination of the foregoing memories. The processor 1201 and the memory 1203 are connected to each other and communicate with each other by using the system bus 1202.

The transmitter 1205 may be implemented by any one of an optical transmitter, an electronic transmitter, or a wireless transmitter, or a combination thereof. For example, the optical transmitter may be a small form-factor pluggable (SFP) transmitter, an enhanced small form-factor pluggable (SFP+) transmitter, or a 10-GB small form-factor pluggable (XFP) transmitter. The electronic transmitter may be an Ethernet network interface controller (NIC). The wireless transmitter may be a wireless network interface controller (WNIC).

The receiver 1204 may be implemented by any one of an optical receiver, an electronic receiver, or a wireless receiver, or a combination thereof. For example, the optical receiver may be a small form-factor pluggable receiver, an enhanced small form-factor pluggable receiver, or a 10-GB small form-factor pluggable receiver. The electronic receiver may be an Ethernet network interface controller. The wireless receiver may be a wireless network interface controller.

The hardware device 120 may be the host controller 80. The processor 1201 performs the foregoing functions of the generation unit 801. The transmitter 1205 is the sending unit 802, and the receiver 1204 is the receiving unit 803.

The hardware device 120 may be the host 90. The receiver 1204 is the receiving unit 901. The transmitter 1205 is the sending unit 904. The processor 1201 performs the foregoing functions of the hot plug operation unit 902 and the generation unit 903.

The hardware device 120 may be the host 100. The processor 1201 performs the foregoing functions of the detecting unit 1001 and the hot plug operation unit 1002. In this case, the hardware device 120 may not include the receiver 1204 and the transmitter 1205.

The hardware device 120 may be the first PCIe bridge device 110. The processor 1201 performs the foregoing functions of the detecting unit 1101 and the generation unit 1102. In this case, the hardware device 120 may not include the receiver 1204 and the transmitter 1205.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing apparatus, refer to a corresponding process in the foregoing method embodiments, and details are not described herein again.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments. In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A hot plug method, wherein the method is applied to a remote Peripheral Component Interconnect Express (PCIe)

system, wherein the remote PCIe system comprises a host, a host controller, a PCIe device, and a user equipment controller, and the hot plug method comprises:

generating, by the host controller, a first notification packet, wherein the first notification packet includes hot plug interruption information, the hot plug interruption information indicating that the PCIe device is to be hot-plugged, wherein the host is connected to the host controller, the PCIe device is connected to the user equipment controller, and the host controller communicates with the user equipment controller through a network;

sending, by the host controller, the first notification packet to the host;

receiving, by the host, the first notification packet sent by the host controller;

performing, by the host according to the first notification packet, a hot plug operation corresponding to the PCIe device;

generating, by the host, a second notification packet, and sending the second notification packet to the host controller, wherein the second notification packet is for indicating that the hot plug operation corresponding to the PCIe device is completed; and receiving, by the host controller, the second notification packet sent by the host, and sending the second notification packet to the user equipment controller, to facilitate the user equipment controller to instruct a user to insert or remove the PCIe device.

2. The hot plug method according to claim 1, wherein generating the first notification packet comprises:

receiving, by the host controller, a third notification packet sent by the user equipment controller, wherein the third notification packet is generated by the user equipment controller after the user equipment controller detects that hot plug is triggered, and the third notification packet includes the hot plug interruption information; and generating, by the host controller, the first notification packet according to the third notification packet.

3. The hot plug method according to claim 1, wherein generating the first notification packet comprises:

generating, by the host controller, the first notification packet when that hot plug is triggered is detected.

4. The hot plug method according to claim 1, wherein generating the first notification packet comprises:

generating, by the host controller, the first notification packet when that the network between the host controller and the user equipment controller is disconnected is detected.

5. The hot plug method according to claim 1, wherein performing the hot plug operation corresponding to the PCIe comprises:

obtaining, by the host, identification information of the PCIe device and slot information corresponding to the PCIe device;

determining, by the host, a first slot corresponding to the slot information; and disrupting, by the host, a connection between the first slot and the PCIe device, and powering off the first slot.

6. The hot plug method according to claim 1, wherein performing the hot plug operation corresponding to the PCIe device:

obtaining, by the host, slot information of a first slot, wherein the first slot is a slot corresponding to the PCIe device; and establishing, by the host, a connection between the first slot and the PCIe device, and powering on the first slot.

7. A hot plug method, wherein the method is applied to a remote Peripheral Component Interconnect Express (PCIe) system, wherein the PCIe system includes a host, a first PCIe bridge device, a second PCIe bridge device and N PCIe devices, the first PCIe bridge device is connected to the host, the first PCIe bridge device is connected to the second PCIe bridge device, the N PCIe devices are mounted in downstream of the second PCIe bridge device, wherein N is an integer greater than or equal to 1, and wherein the method comprises:

detecting, by the first PCIe bridge device, whether a second link is abnormal, wherein the second link is a link between the first PCIe bridge device and the second PCIe bridge device; and generating, by the first PCIe bridge device, N notification packets after detecting the second link is abnormal, wherein the N notification packets are used to instruct the host to perform a hot plug operation corresponding to the N PCIe devices; and wherein the method further comprises:

determining, by the first PCIe bridge device according to a prestored PCIe topology structure, N pieces of identification information of the N PCIe devices and N pieces of slot information corresponding to the N PCIe devices;

generating N pieces of hot plug interruption information according to the N pieces of identification information and the N pieces of slot information; and generating a notification packet according to each of the N pieces of hot plug interruption information, to obtain the N notification packets.

8. The hot plug method according to claim 7, wherein the method further comprises:

detecting, by the host, whether a first link is abnormal, wherein the first link is a link between the host and the PCIe bridge device; and performing, by the host, a hot plug operation corresponding to the N PCIe devices when the host detecting the first link is abnormal.

9. The hot plug method according to claim 7, wherein performing the hot plug operation corresponding to the at least one PCIe device comprises:

obtaining, by the host, identification information of each of the N PCIe devices and slot information corresponding to each PCIe device; and disrupting, by the host, a connection between each PCIe device and a slot corresponding to each PCIe device, and powering off the slot corresponding to each PCIe device.

10. The hot plug method according to claim 7, wherein the first PCIe bridge device is a first PCIe switch, or the second PCIe bridge device is a second PCIe switch.

11. A remote Peripheral Component Interconnect Express (PCIe) system, wherein the system comprises a host and a host controller, a PCIe device, and a user equipment controller, the host is connected to the host controller, the PCIe device is connected to the user equipment controller, and the host controller communicates with the user equipment controller through a network, wherein, the host controller is configured to:

generate a first notification packet, wherein the first notification packet includes hot plug interruption information, wherein the hot plug interruption information indicating that the PCIe device is to be hot-plugged,
to send the first notification packet to the host,
to receive a second notification packet sent by the host, and
to send the second notification packet to the user equipment controller, wherein the second notification packet is for indicating that the hot plug operation corresponding to the PCIe device is completed; and the host is configured to:
receive the first notification packet,
perform a hot plug operation corresponding to the PCIe device according to the first notification packet,
generate the second notification packet, and
send the second notification packet to the host controller.

12. The system according to claim 11, wherein
the host controller is further configured to: for hot-inserting the PCIe device, receive a third notification packet sent by the user equipment controller, and generate the first notification packet according to the third notification packet, wherein the third notification packet is generated by the user equipment controller after the user equipment controller detects that hot plug is triggered, and the third notification packet includes the hot plug interruption information.

13. The system according to claim 11, wherein the host controller is further configured to generate the first notification packet when that hot plug is triggered is detected.

14. The system according to claim 11, wherein the host controller is further configured to: when the PCIe device is to be hot-removed, generate the first notification packet when that the network between the host controller and the user equipment controller is disconnected is detected.

15. The system according to claim 11, wherein the host is further configured to:
obtain identification information of the PCIe device and slot information corresponding to the PCIe device;
determine a first slot corresponding to the slot information; and
disrupt a connection between the first slot and the PCIe device, and power off the first slot.

16. The system according to claim 11, wherein the host is further configured to: obtain slot information of a first slot, wherein the first slot is a slot corresponding to the PCIe device; and establish a connection between the first slot and the PCIe device, and power on the first slot.

* * * * *